United States Patent [19]

Hall

[11] Patent Number: 4,701,074
[45] Date of Patent: Oct. 20, 1987

[54] APPARATUS FOR FORMING A GROUTED MEMBER IN DEEP WATER

[75] Inventor: Stephen G. Hall, Dundee, Scotland

[73] Assignee: Wimpey Laboratories Limited, Hayes, England

[21] Appl. No.: 852,999

[22] Filed: Apr. 17, 1986

[51] Int. Cl.$^4$ ............................................. F16L 1/04
[52] U.S. Cl. .................................. 405/169; 403/323; 403/324; 285/404; 285/305; 285/24; 285/920; 405/225; 405/190
[58] Field of Search ............... 405/225, 227, 190, 169, 405/170; 285/91, 920, 403, 404, 305, 308, 312, 314, 18, 24; 403/323, 324

[56] References Cited

U.S. PATENT DOCUMENTS

| | | | |
|---|---|---|---|
| 680,830 | 8/1901 | Wray | 403/323 |
| 2,680,358 | 6/1954 | Zublin | 285/91 |
| 3,137,348 | 6/1964 | Ahlstone | 285/920 |
| 3,314,239 | 4/1967 | Baron et al. | 405/223 |
| 3,316,723 | 5/1967 | Schutte | 405/223 |
| 3,490,795 | 1/1970 | Hennlich | 285/305 |
| 3,558,160 | 1/1971 | Falkner | 285/404 |
| 4,472,081 | 9/1984 | Lawson | 405/227 |
| 4,570,980 | 2/1986 | Goward | 285/403 |

FOREIGN PATENT DOCUMENTS

| | | | |
|---|---|---|---|
| 641782 | 5/1962 | Canada | 405/223 |
| 534763 | 10/1931 | Fed. Rep. of Germany | 285/91 |
| 2915391 | 10/1980 | Fed. Rep. of Germany | 285/305 |
| 26764 | of 1914 | United Kingdom | 285/404 |
| 564527 | 10/1944 | United Kingdom | 285/305 |
| 569784 | 8/1977 | U.S.S.R. | 285/314 |
| 756129 | 8/1980 | U.S.S.R. | 285/305 |

Primary Examiner—Cornelius J. Husar
Assistant Examiner—Eric K. Nicholson
Attorney, Agent, or Firm—Paul L. Sjoquist

[57] ABSTRACT

Apparatus for forming a grouting member, for example, a grouted pile, in deep water comprises a female coupling member for connection to a male coupling member located on the sea bed, a conical guide for guiding the male coupling member into engagement with the female coupling member, a rotatable locking pin having an arcute recess portion, operable by a remotely operated underwater vehicle, for retaining the male coupling member in engagement with the female coupling member, and a connector for connecting the female coupling member to a source of grouting material.

8 Claims, 3 Drawing Figures

U.S. Patent  Oct. 20, 1987  Sheet 1 of 3  4,701,074
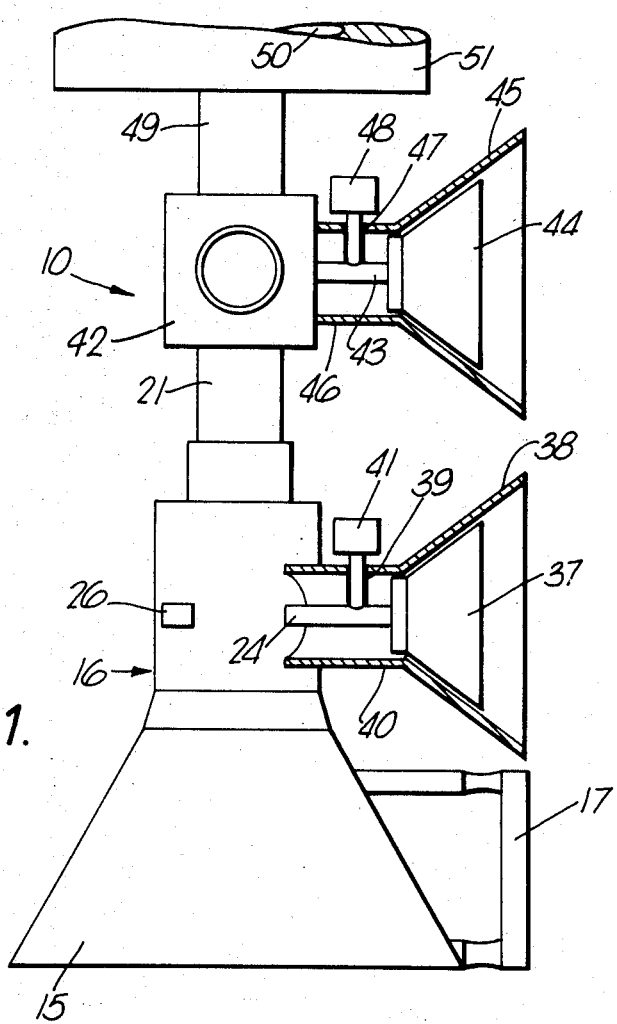
Fig. 1.
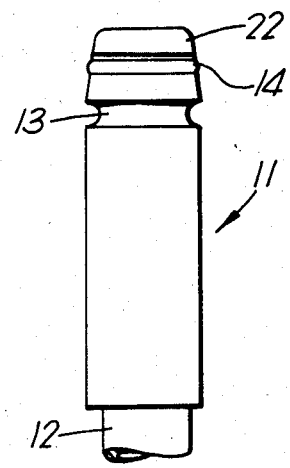

APPARATUS FOR FORMING A GROUTED MEMBER IN DEEP WATER

This invention relates to apparatus for forming grouted members in deep water.

Platforms are located in deep water by means of piles driven into the seabed and fixed to legs of the platform. These piles are surrounded by sleeves which are filled with grouting material. Conventionally, pipework extends from the deck of the platform along the length of each leg of the platform, and grouting material is forced along this pipework to the respective sleeves. Once the pile has been grouted in place, this pipework is redundant. However, the cost of installing the pipework on the platform is quite considerable.

The present invention therefore seeks to provide an apparatus for forming grouted members, e.g. piles, in deep water, where the permanent installation of expensive pipework to the surface is not required.

According to the present invention there is provided an apparatus for forming a grouted member in deep water comprising: a female coupling member for connection to a male coupling member located on the seabed; guide means for guiding the male coupling member into engagement with the female coupling member; locking means, operable by a remotely operated underwater vehicle, for retaining the male coupling member in engagement with the female coupling member; and means for connecting the female coupling member to a source of grouting material.

Preferably the locking means comprises a pin rotatably mounted in the coupling member, the pin having a recess which, in an unlocked position, permits the insertion of the male coupling member into the female coupling member and in a locked position, engages in a groove in the male coupling member to retain the male coupling member in engagement with the female coupling member.

The apparatus may include means for limiting rotation of the pin.

The apparatus preferably includes further guide means for guiding an operating member of the underwater vehicle into engagement with the locking means.

In the preferred embodiment the apparatus includes valve means for controlling flow of grouting material to the female coupling member. The apparatus may include operating means, operable by the underwater vehicle, for moving the valve means between open and closed positions. Means may be provided for limiting rotation of the operating means.

The apparatus may include guide means for guiding an operating member of the underwater vehicle into engagement with the operating means.

The apparatus is preferably in combination with the male coupling member. Thus the apparatus preferably includes sealing means on the male coupling member for effecting a seal between the female coupling member and the male coupling member when the latter is inserted into the former.

The invention is illustrated, merely by way of example, in the accompanying drawings, in which:

FIG. 1 is a schematic diagram, partially broken away, of an apparatus according to the present invention for grouting piles in deep water;

Figure 2:
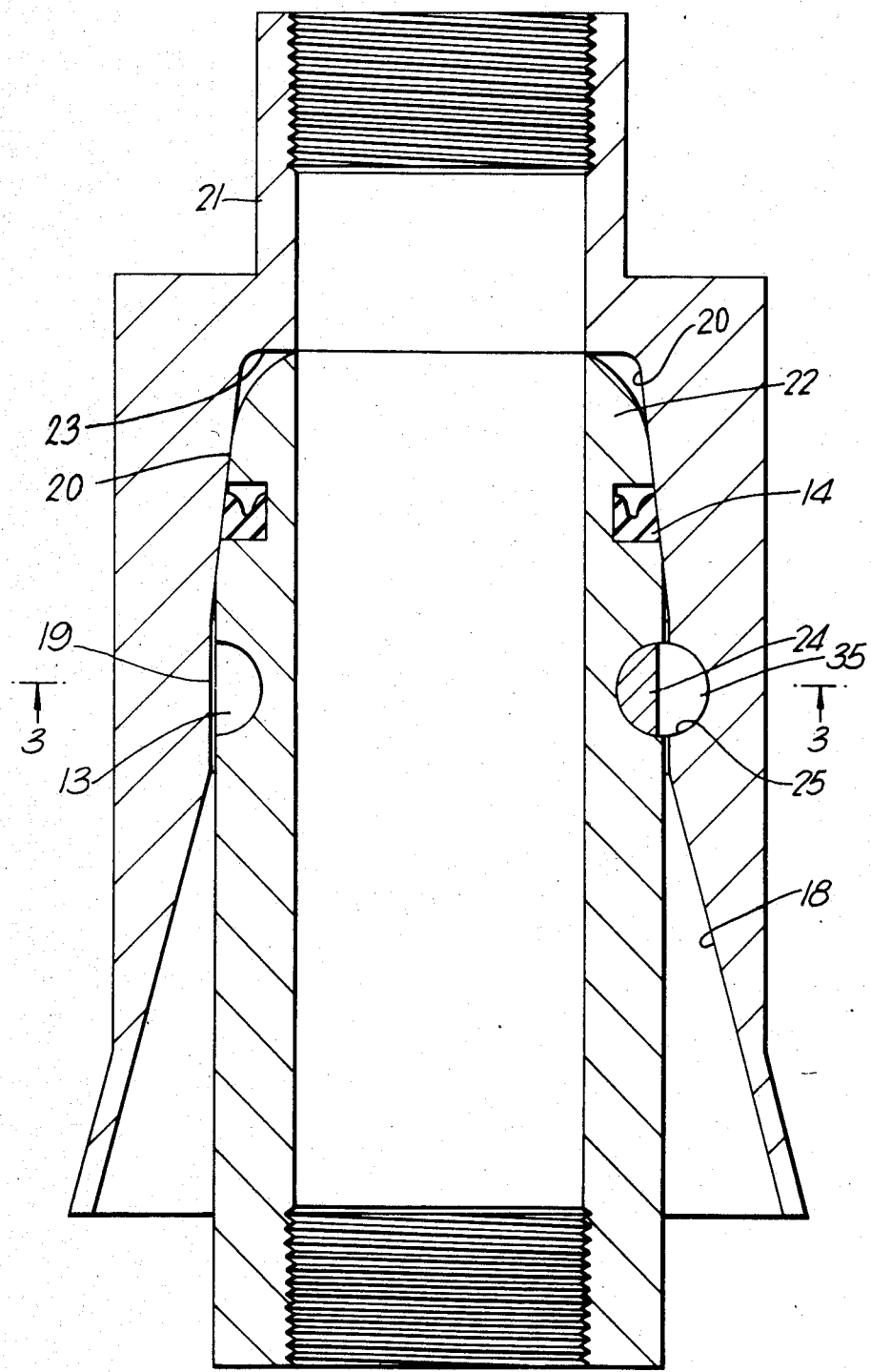
FIG. 2 is a cross-section of male and female coupling members of the apparatus of FIG. 1.

Referring to FIG. 1 there is shown a preferred embodiment of an apparatus 10 according to the present invention for grouting piles of a platform in deep water. The apparatus is operated by a conventional remotely operated underwater vehicle (not shown) which is controlled by an operator, for example, on a deck of the platform.

A male coupling member 11 is connected to a grout pipe 12 through which grout is supplied to a jacket or sleeve (not shown) surrounding a pile to be grouted. The male coupling member is fixed to the pipe 12 and is, therefore, permanently installed on the sea bed. The male coupling member 11 is cylindrical and has an annular locking pin groove 13 and a sealing member 14 (best seen in FIG. 2) having a U-shaped cross-section.

The apparatus 10 has a male coupling cone 15 for guiding the male coupling member 11 towards a female coupling member 16. The cone 15 has fixed thereto at least one handle 17. An arm (not shown) of the underwater vehicle engages the handle 17 and transports the apparatus 10 until the cone 15 is positioned substantially centrally over the male coupling member 11. The apparatus 10 is then lowered onto the male coupling member, the cone 15 guiding the male coupling member towards the female coupling member 16.

The female coupling member 16, best seen in FIG. 2, has a first conical inner surface 18 which forms a smooth continuation of the inner wall of the cone 15, a substantially cylindrical inner surface 19, a further conical surface 20 with a smaller cone angle than the conical surface 18 and a cylindrical conduit 21. The male coupling member 11 is guided by the cone 15 and the conical surface 18 of the female coupling member 16 so that when fully inserted into the female coupling member, a head 22 of the male coupling member seats against the surface 20 compressing the sealing member 14. It will be appreciated that the conical surface 20 and the surface of the head 22 of the male coupling member are complementary so that the sealing member 14 forms an effective seal between the two. The insertion of the male coupling member 11 into the female coupling member 16 is limited by an annular ledge 23. The ledge 23 is so disposed to prevent the male coupling member 11 from becoming wedged in the female coupling member 16 whilst still allowing the sealing member 14 to form an effective seal.

Figure 3:
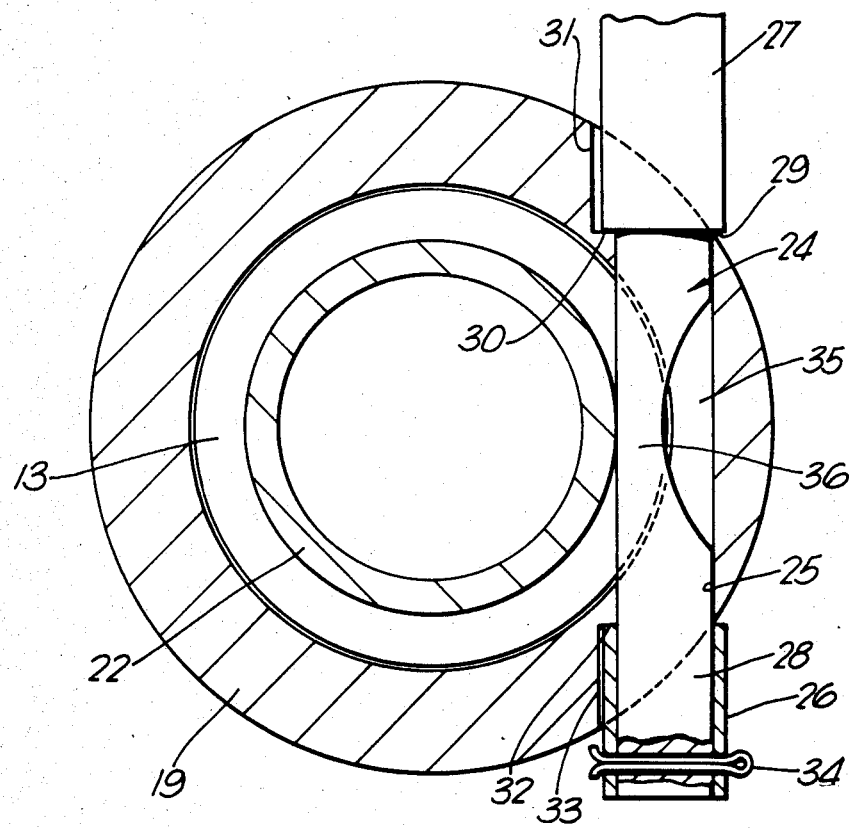
FIG. 3 is a section taken along the line 3—3 of FIG. 2.

When the male coupling member 11 is fully inserted into the female coupling member 16 the groove 13 in the former is disposed adjacent to a locking pin 24 best shown in FIG. 3. The locking pin passes through a passageway 25 in the female coupling member and is free to rotate therein. The locking pin 24 has an enlarged diameter cylindrical portion 27 and a reduced diameter cylindrical portion 28. A ledge 29 between the portions 27,28 rests on a surface 30 of a cut-away portion 31 of the female coupling member thus limiting axial insertion of the locking pin 24 into the passageway 25. A bushing 26 seats on a surface 32 of a cut-away portion 33 of the female coupling member and the bushing is connected to the locking pin 24 by means of a split pin 34. Thus the locking pin 24 is axially located in the passageway 25 but can be removed, if necessary, for example, for cleaning or repair, by removing the split pin 34 and the bushing 26 allowing the locking pin 24 to be withdrawn from the passageway 25.

The locking pin 24 has a recess 35 which, when the locking pin 24 is in unlocked position forms a continuation of the cylindrical surface 19 of the female coupling member 16. Thus the male coupling member 11 can be fully inserted into the female coupling member 16. When the locking pin 24 is rotated 180° to a locked position (shown in FIGS. 2 and 3) a portion 36 of the locking pin 24 enters the groove 13 in the male coupling member 11 thus preventing it from being removed from the female coupling member.

The locking pin 24 carries a trapezoidal plate member 37 (FIG. 1) which, in operation, connects with an operating member of the underwater vehicle to be rotated thereby. The plate member 37 is surrounded by a conical housing 38 fixed to the female coupling member via a cylindrical neck 40. The purpose of the housing 38 is to guide the operating member of the underwater vehicle towards the plate member 37. A slot 39, extending over 180°, is cut in the neck 40 and an abutment pin 41 extends through this slot and is fixed to the locking pin 24. Thus the slot 39 limits rotation of the locking pin 24 and its ends define the locked and unlocked positions. It will be appreciated that the abutment pin 41 can be removed from the locking pin 24 to enable the latter to be removed from the passageway 25 as discussed above. Thus, for example, the abutment pin 41 may be screw-threaded into an appropriate aperture or hole in the locking pin 24.

The conduit 21 is connected to a valve 42. The valve 42 has a hollow rectangular stem 43 to the free end of which there is fixed a trapezoidal plate member 44, similar to the plate member 37. The plate member 44 is surrounded by a conical housing 45 connected to the valve 42 by a cylindrical neck 46. The purpose of the housing 45 is to guide the operating member of the underwater vehicle towards the plate member 44. A slot 47, extending over 90°, is cut in the neck 46, and an abutment pin 48 extends through this slot and is fixed to the stem 43. Thus the slot 47 limits rotation of the pin 48 and its ends define open and closed positions of the valve 42. The valve 42 may be of any known type, for example, a butterfly valve.

In operation, the operating member of the underwater vehicle connects to the plate member 44 and is rotated through 90° so that the valve 42 is moved between open and closed positions. The valve 42 thus controls the flow of grouting material from a conduit 49 to the conduit 21. The conduit 49 is connected to a pipeline 50 which connects the apparatus 10 to a source (not shown) of grouting material under pressure, e.g. 70 kg/cm² (1000 psi) located, for example, on the deck of the platform. At least a part of the pipeline 50 is surrounded by a buoyancy device 51 so that the pipeline 50 has either neutral or slightly negative buoyancy when there is no grouting material therein. Thus there is no necessity to fix the pipeline 50 to legs of the platform.

In operation, in order to fill a sleeve surrounding a pile on the sea bed with grouting material, the underwater vehicle carries the apparatus 10, after having been connected to the pipeline 50, so that it is positioned substantially over the male coupling member 11. The underwater vehicle then lowers the apparatus 10, and the male coupling member is guided into the female coupling member 16. When fully inserted, an operating member on the underwater vehicle engages a plate 37 and rotates it through 180° whereby the locking pin 24 engages in the groove 13 of the male coupling member 11 locking it to the female coupling member. The operating member on the underwater vehicle then engages the plate member 44 and rotates it through 90°, thereby moving the valve 42 to the open position so that grouting material can pass through the apparatus 10 to the sleeve to be grouted.

It will be appreciated that the apparatus according to the present invention and described above removes the necessity for fixed pipework on a platform to supply grouting material to sleeves surrounding piles and thus represents a considerable saving in cost.

I claim:

1. Apparatus for forming a grouting member underwater comprising: a female coupling member for connection to a male coupling member located on a bed beneath the water; guide means for guiding the female coupling member into engagement with the male coupling member; remotely operable locking means, for retaining the male coupling member in engagement with the female coupling member; and means for connecting the female coupling member to a source of grouting material, the locking means comprising a pin rotatably mounted in the female coupling member, the pin having a recess which, in an unlocked position, permits axial insertion of the male coupling member into the female coupling member and in a locked position, engages in an annular groove in the male coupling member to retain the male coupling member in engagement with the female coupling member.

2. Apparatus as claimed in claim 1 including means for limiting rotation of the pin.

3. Apparatus as claimed in claims 1 or 3 including further guide means for guiding an operating member into engagement with the locking means.

4. Apparatus as claimed in any one of claims 1 to 3 including valve means for controlling flow of grouting material to the female coupling member.

5. Apparatus as claimed in claim 4 including operating means, for moving the valve means between open and closed positions.

6. Apparatus as claimed in claim 5 including means for limiting movement of the operating means.

7. Apparatus as claimed in claim 6 incuding guide means for guiding an operating member into engagement with the operating means.

8. Apparatus for forming a grouting member underwater by remotely coupling and decoupling a female grouting material feed member to a male grouting material receiving member affixed to an underwater platform; said male grouting material receiving member comprising an end having an annular sealing means thereon and an annular groove proximate said end; said female grouting material feed member comprising an end having an enlarged mouth tapered to a reduced diameter coupling section shaped for sealable engagement over said male member annular sealing means, and a rotatable pin through said coupling section and positioned to engage said male member annular groove, said pin having an arcuate recess portion which is rotatably positionable to disengage said pin from said male member annular groove.

* * * * *